July 24, 1951 E. R. LOCHMAN 2,561,705
PROPELLER AND METHODS OF PROPELLER MANUFACTURE
Filed Aug. 8, 1942 3 Sheets-Sheet 1
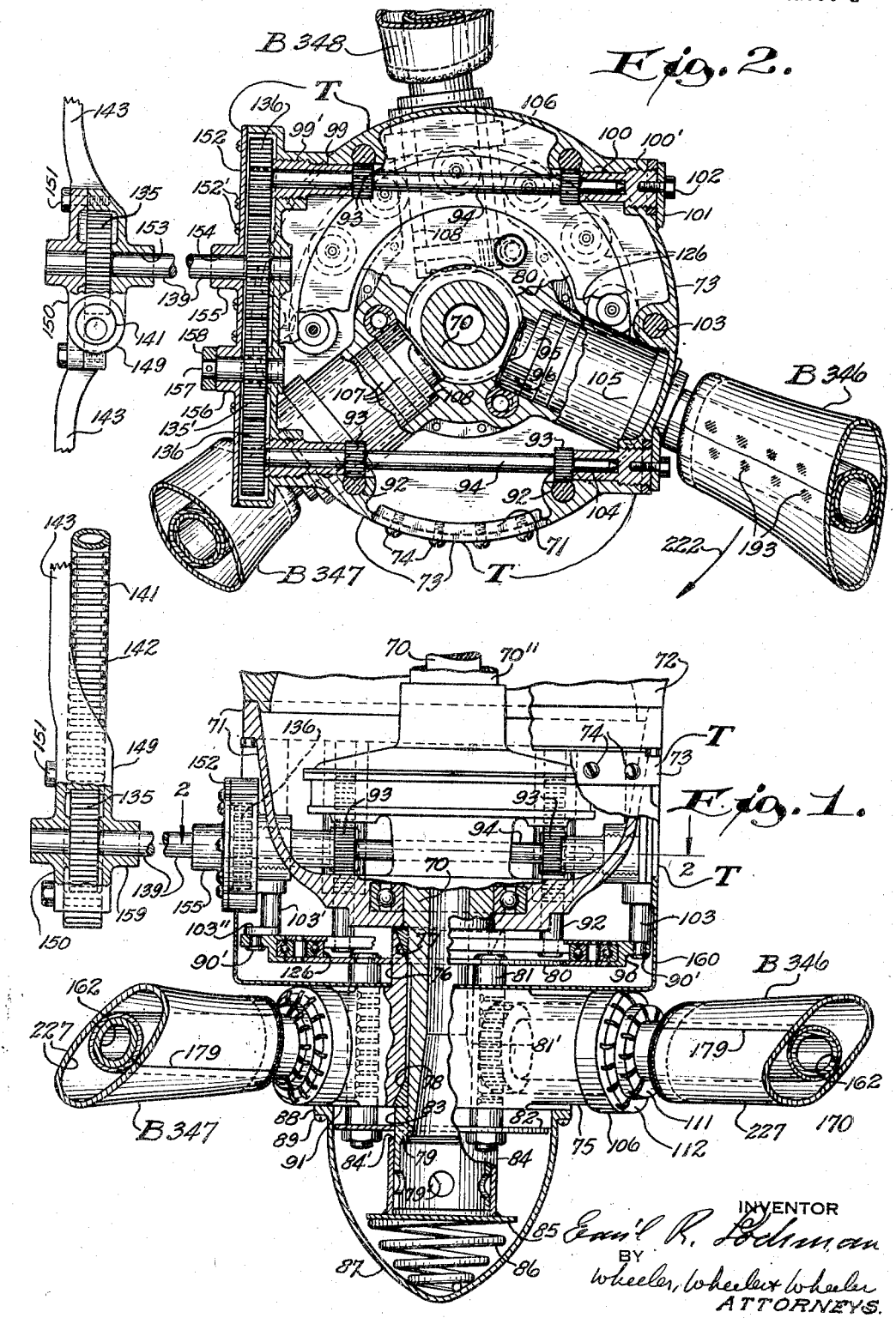
INVENTOR
Em'l R. Lochman
BY
Wheeler, Wheeler & Wheeler
ATTORNEYS.

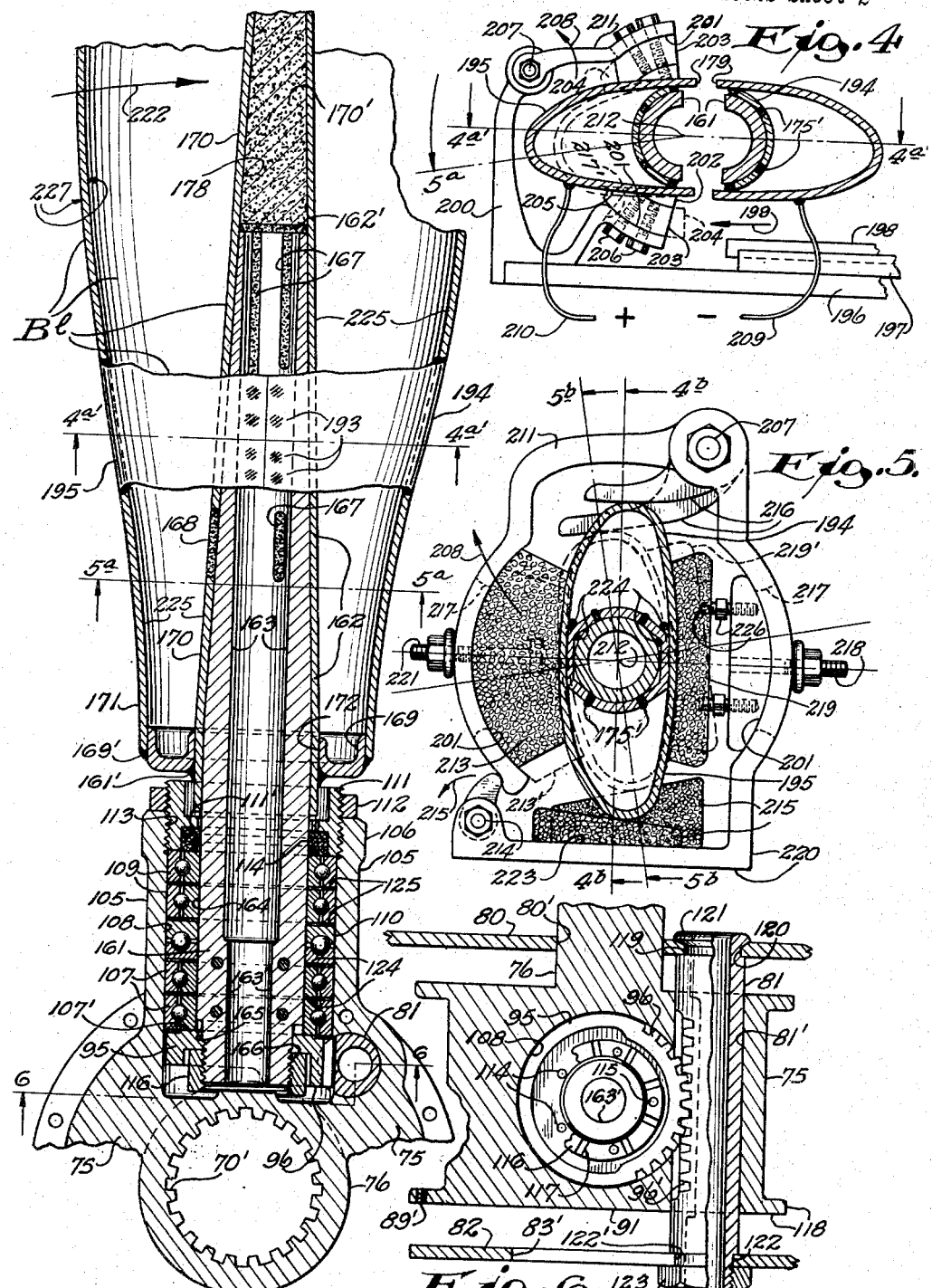

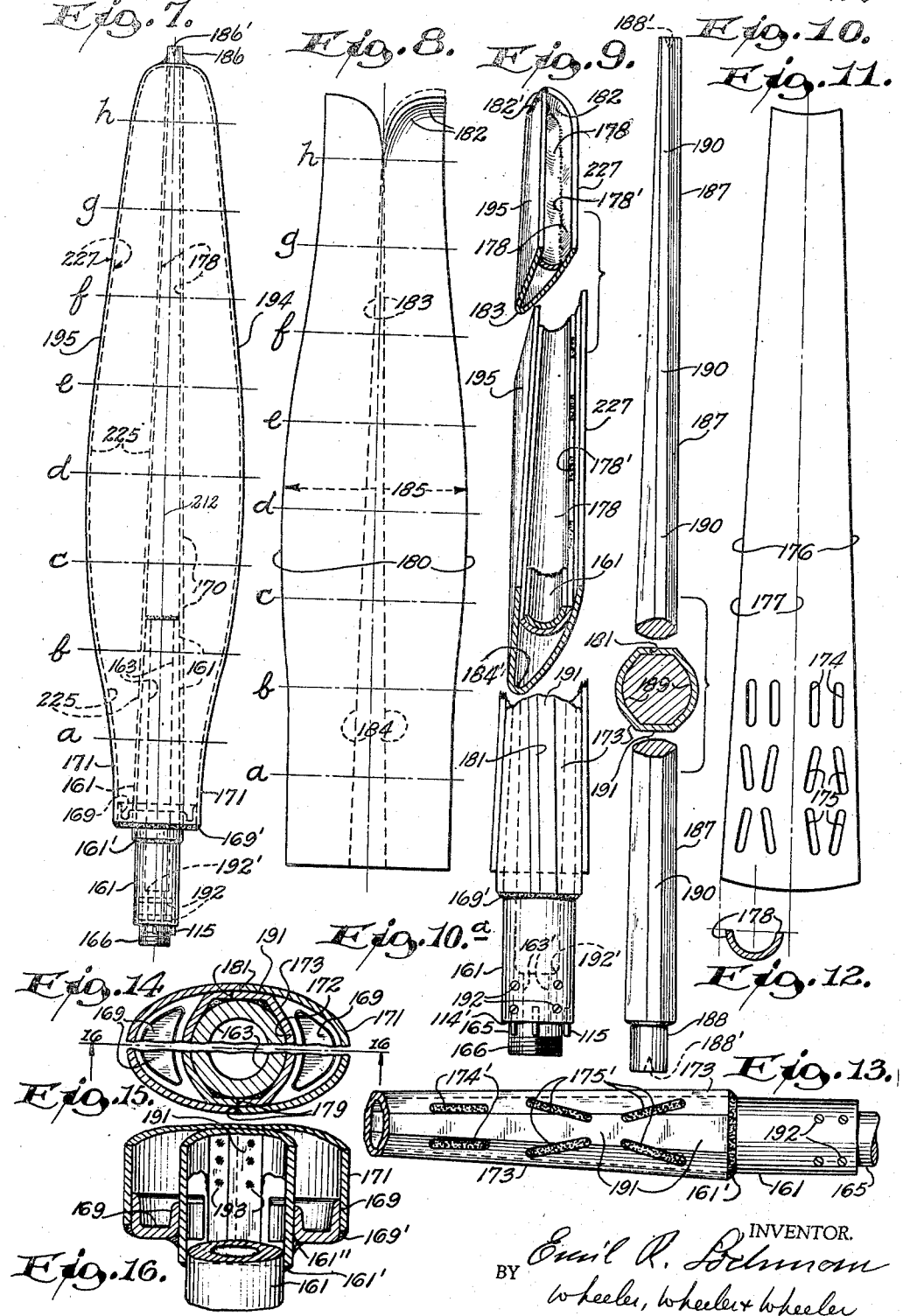

Patented July 24, 1951

2,561,705

UNITED STATES PATENT OFFICE 2,561,705

PROPELLER AND METHOD OF PROPELLER MANUFACTURE

Emil R. Lochman, Milwaukee, Wis.

Application August 8, 1942, Serial No. 454,146

7 Claims. (Cl. 170—159)

This invention relates to propellers and methods of propeller manufacture, and more particularly to a controllable pitch propeller for varying and controlling the pitch of the propeller in accordance with the operating conditions.

The principal object of this invention is to provide a simplified construction of a controllable pitch propeller, adapted for mass production, and adapted to be used and mounted on the engine shafts of the present day airplane engines, for immediate production.

A further object of the present invention is to reduce the number of operating parts, to avoid parts requiring very costly machining operations.

While any type of blade may be used in the feathering hub construction disclosed herein, it is a further object of this invention to improve propeller construction by strong internal reenforcements of a hollow blade and by changing the shape of the blade to avoid extreme forming strains and by providing a method of forming the blade in two halves and leaving a hollow passage from the root to the tip of the blade in the form of a combination spar for the purpose of aiding in the construction of the blade as well as increasing its strength, rigidity and thrust capacity.

Further objects of the invention will appear in the following disclosure. The means by which the objects of the invention are obtained are more fully described with reference to the drawings, in which:

Figure 1 is a top plan view of the propeller assembly, with parts broken away to show part of the hub section and other operating parts in cross section, as well as showing the nose section of the airplane engine and the manner in which the propeller is attached thereto.

Figure 2 is a rear elevation of the propeller assembly, with parts cut away showing a cross section of the operating parts on line 2—2 of Figure 1, but omitting the nose section of the airplane engine, while the propeller hub has parts broken away to show a part in cross section.

Figure 3 is a fragmentary view of a single blade assembly in its respective hub socket, showing in radial section the respective operating parts and certain welding joints, a part of the blade appearing in elevation.

Figure 4 is a side view of the essential parts of a welding device showing two halves of a propeller in cross section as prepared for resistance welding according to the process herein disclosed.

Figure 5 is a side view of a jig showing the cross section of a propeller prepared for brazing in a brazing furnace.

Figure 6 is a fragmentary cross sectional view of a hub assembly on line 6—6 of Figure 3, showing the rack and pinion control of a propeller blade.

Figure 7 is a front elevation of a propeller blade showing the essential parts of the construction, including the core shaft and the connecting internal spar.

Figure 8 is a plan view of the blank for forming a half section of a propeller blade.

Figure 9 is a perspective cross sectional view of propeller sections showing the internal spar in half section as prepared for resistance welding the half blades shown in Figure 4.

Figure 10 is a plan view of a core die for forming the spar with a surface for attaching the blade sections according and conforming to the pitch of the blade.

Figure 10a is a fragmentary elevation of the bottom section of the core shaft showing the spar and a half section of the blade attached thereto.

Figure 11 is a plan view of the spar blank, showing welding slots.

Figure 12 is a cross section of a half spar prepared from a half section of said spar blank for use as shown in Figure 9.

Figure 13 is a plan view of the bottom section of the core shaft showing the bottom section of the spar welded thereto.

Figure 14 is a fragmentary cross section of the root of the blade showing the relative parts of the core shaft, spar and blade section welded and brazed together.

Figure 15 is a fragmentary cross sectional view of the same parts as arranged for resistance welding.

Figure 16 is a cross section on line 16—16 of Figure 13, with parts broken away showing the position for the end fillers, welded in place to close and finish the bottom of the blade, also showing spot welding for rigidly connecting the spar to the blade.

It will of course be understood that the description and drawings are merely illustrative of the present preferred form of application, and that various changes and modifications may be made in the structure disclosed without departing from the spirit of the invention, especially in fitting it to various types of airplanes and for their varying requirements and services.

Several of the features of my invention are usable independently of each other and in various combinations, being separately described and claimed. I shall hereinafter summarize these features and their properties.

For assistance in analyzing my disclosure, I may state that the complete apparatus hereinafter to be described includes:

1. A variable pitch propeller having important features of hub design, irrespective of the particular blades used therein.

2. A novel and improved propeller blade structure and process of manufacture which is particularly adapted for a variable pitch propeller, but may be used in any propeller of variable pitch or otherwise, and irrespective of the particular hub or pitch varying mechanism.

Reference will first be made to Figures 1 and 2, where I have illustrated the:

*Propeller assembly.*—The propeller assembly comprises a hub 75 mounted upon and driven by a propeller shaft 70, which, in some installations, may also comprise the engine shaft, but which, in the device as illustrated, is driven at a reduced speed from the engine shaft 70' through conventional reducing gearing (not specifically illustrated), housed in the casing which is shown in plan in Figure 1 surrounding the engine shaft 70" and the propeller shaft 70.

The propeller shaft projects, in a conventional installation, from the nose housing member 71 of the plane, such member being bowl-shaped. On the projecting portion of the propeller shaft, which, in accordance with conventional practice, is splined, the hub 75, having complementary splines 70', is mounted and positioned between taper collars 77 and 78 which are drawn snugly into the hub by the nut 79 secured to the end of the propeller shaft.

The taper collar 77 is engaged by the tubular rearward extension 76 of the hub proper, along which the actuating disk for feathering the blades of the propeller is slidably movable as will hereinafter be explained.

The one-piece plain hub 75 of suitable steel has three radial blade sockets 105 with plain bores 108 for controllably mounting the three propeller blades B346, B347 and B348. Each blade has a hollow core shaft 162 (see Figure 3) with a finished root section 161 on which I mount in series the nut 111 with its locknut 112; a set of felt washers 114 which are pressed into the recess 111' of nut 111 forming a grease seal; a set of radial ball bearings 109 with their outer races separated by washers 125; a heavy thrust bearing 110; an additional set of radial ball bearings 107 separated at their inner races by washers 124 (thereby transferring the very severe end thrust to the raised section 107' of said pinion 95) and, finally, a pinion 95.

The several parts described as mounted in series on the root section 161 of the propeller core shaft are held thereon by the nut 116 screwed to the inner end of the core shaft. The core shaft, in turn, together with all of the parts above described, is then finally anchored to the blade socket 105 of the hub 75 by the nut 111 and lock nut 112.

In lieu of a key for positively fixing the several propeller core shafts to their respective pinions 95 to assure operation in exact unison, I may use pins which project axially from the core shaft shoulder 114', as shown in Figures 7, 10a and 6. The pin 115 is primarily relied upon to locate the parts, while pins 114 provide supplemental torque transmitting strength.

The teeth 96 of the pinion 95 and the teeth of the racks 81 must be set in precisely the same position for all three blades, and this position is permanently held by the set-pin 115, so that all blades may be taken out and re-inserted and matched precisely at their standard pitch angle.

Intersecting the radial bores 108 for receiving the three blades are bores 81' in axial alignment with the propeller shaft and bored to precisely match said bores 108 to accomplish the precision setting between the pinions 95 and the racks 81, which reciprocate in the bores 81' and are connected with the pressure disk 80 by upsetting their reduced ends against the inner surface of the pressure disk about the holes in the pressure disk through which the reduced ends of the racks 81 extend (Figure 6).

At their forward ends 122 the racks 81 are connected for unitary movement by an annular plate 82 having apertures to receive the reduced and threaded forward ends of the racks 81. Nuts 123 securely clamp the annular plate 82 to the respective racks. The annular plate may be guided for sliding movement along the propeller nut 79 to which its central opening 83' may be fitted (Figure 1 and Figure 6). As the annular plate 82 moves outwardly along the propeller nut 79 it will encounter the pressure cap 84 which is urged rearwardly upon the nut by a powerful compression spring 86 seated in the nose cap 87 bolted to the hub. This spring aids in resisting thrust of the propeller blades in their extreme feathering position, and consequently assists in returning the blades from such extreme feathering position. The four holes 79' provided in the propeller nut are to facilitate the use of a lever for tightening the nut on its shaft, whereby to position the propeller hub snugly between the taper collars 77 and 78 which assure correct tracking of the blades.

*Transmission casing T* is shown in Figure 1 as attached to the nose section 71 of present day engines so that the propellers can be used for badly needed war production without delay, or waste of time for changes of present day equipment. The particular design of the parts shown to illustrate the application of the invention would obviously be quite different but for the desirability of making these parts adaptable to existing engine nose sections.

Figure 2 is shown without said nose section 71, and it is of course self evident that said nose section can readily be built to accommodate the comparative simple transmission parts for operating this new controllable pitch propeller, as the few engine parts housed in said present day nose section readily fit my transmission parts as plainly shown in Figure 1.

An important feature of my invention from a military standpoint lies in the fact that the very important and vulnerable electrical operating parts have been removed from the much exposed nose section, where previously known electrically operated propellers have had such parts. According to my invention, these parts are now placed in the cockpit where they are now under the constant observation of the aviator and a hand control is provided so that under fighting conditions where any of the control parts may be destroyed the aviator can keep flying by using the hand control and this enables him to make a safe landing.

My improved transmission T comprises a band 73 applicable by means of screws 74 to the existing nose section 71 of the plane. As best shown in Figure 2, this casing provides bearings at 99 and 100 for the upper and lower shafts 94 which are connected by a gear train comprising intermediate gears 135 and gears 136, which are respectively mounted upon the shafts 94 so that such shafts turn in unison.

Each of the shafts 94 carries two pinions 93, the several pinions being properly located to mesh with four racks 92 connected to the non-rotative outer race 90 of a composite anti-friction bearing set through which motion is transmitted to the pressure disk 80 for actuating the blade feathering racks 81. The non-rotatable outer race 90 is further guided in its axial reciprocation by the rods 103 and 103' (Figure 1).

Because of the high speed rotation involved, I find it convenient to provide the anti-friction connection between the outer race 90 and the pressure plate 80 by means of rollers 126, each of which is provided with its own anti-friction bearing mounting upon the pressure plate 80.

It will be apparent that by the arrangement described any rotation of shafts 94 is immediately translated by means of the pinions 93 and the racks 92 into an axial movement of the outer race 90, such axial movement being communicated through the bearing structure 126 to the pressure plate 80 and thence, by means of racks 81 and pinions 95, again translated into feathering rotation of the respective blades upon their respective axes. The mechanism described is extremely sturdy, simple, and effective, and the disposition of the cross shafts 94 is such that they may be fitted around the existing nose section of present day airplanes without interference with any of the existing structure. The only requirement is that transverse openings be bored into the existing nose casings 71 to receive these shafts and their bearings.

So sturdy a mechanism requires no protection but it may be enclosed for streamlining purposes and for dirt exclusion by a housing 160 (Figure 1).

The power for operating the actuating connections thus far described may be derived in a variety of ways. But I have chosen, for illustrative purposes, to show the power communicated to this mechanism by means of another rack 141 which extends from the pilot's compartment to mesh with a pinion 135 on a shaft 139 connected to one of the gears 135' in the gear train, which provides connection between shafts 94 (see Figures 1 and 2).

Thus, in my preferred organization, there are three stages of transmission, each involving rack and pinion. In the first the reciprocating motion of the rack 141, engaging pinion 135 is used to rotate shaft 139. In the second rack and pinion stage, the rotation of the shafts 94 (gear connected with shaft 139) is used to reciprocate the racks 92. This motion, communicated through the outer race 90 of the anti-friction bearings 126 to the rotative pressure plate 80, reciprocates the racks 81 in the third stage to effect feathering movement of the respective blades.

The hollow steel blade structure is provided to meet the needs of a sturdy pitch adjusting propeller with power and size adequate to serve large military and transport planes. The structure and its method of construction are adapted considerably to increase the rigidity and strength of the blades with particular reference to their ability to withstand combined torsional and centrigual strains throughout the blades, but especially in the root section thereof. The various features of the blade and its method of manufacture are shown in Figures 3 to 16, inclusive, in addition to the partial disclosure in Figures 1 and 2.

Figure 3 shows the assembly of the root of the blade mounted in the bore 108 of the hub socket 105 as above described; the core shaft 161 has a taper 162 to conform with the tapering form of the spar 170. The spar practically forms a continuation of the shaft, being mounted thereon by plug welding 175' (see Figures 4, 5 and 13) through punched slots 174, 175 formed in the blank 176 of Figure 11. The core shaft 161 and spar 170 undergo several fabrication stages before being finally incorporated into the propeller blade. As best shown in Fig. 4 the preferred form of core and spar are first independently formed into longitudinal channel-shaped half sections. Each half section is then separately welded to the respective half blade sections 194, 195 prior to the mid-chord mating thereof. Upon the mating of the blade half sections, as shown in Fig. 4, the core shaft and spar half sections are also thereby joined along longitudinal mid-chords to comprise a complete shaft and spar as shown in Figures 10, 10a, 5 and 13. The core shaft and spar half sections are firmly joined by welds applied to their mating edges at the same time as the blade half sections are mated. As best shown in Fig. 15 the same weld 179 desirably joins both spar half sections and blade half sections. In addition to this connection the projecting stub shaft of the core 161 has its two parts united by the screw bolts 192. As best shown in Figs. 3, 7, and 9 the core shaft 161 extends only partially into the propeller blade and terminates at weld 162. The spar 170, however, continues on for the entire length of the blade, dividing toward the tip, as shown at 178, into spaced arcuate webs as the blade narrows. Figure 12 shows a half spar formed from the half blank 177 and used in the process of joining the two half blades 194, 195 by arc welding as shown in Figure 4, where the two half blades are held firmly in mutually insulated carriage clamps of an arc welding apparatus, each being especially prepared with circular sections 201 and respectively blocks 203 fitting thereto, and being adjustable in slots 217' for the purpose of accurately setting the respective blade sections, all being adjusted to the common axial center 212, of which two are shown; namely sections 4a' and 5a.

The respective adjustment of the latter is shown in dotted lines 204, 204. For repetition work at the same setting the bolt 207 is opened and the upper linked portion 211 is swung open as shown by arrow 208 for taking out a welded propeller and inserting two other half blades without changing the respective section blocks 203, 203. For clearness of presentation only one clamping carriage device is shown while another like clamping apparatus is mounted on the slide 198, being moved on the slide rails 197 mounted on the bed 196 for the purpose of accurately holding the two half sections for resistance welding, for which object the blade edges 179 are somewhat extended so they can fuse during the application of the current on wires 209, 210.

The hollow spar has the further object of receiving the welding grit and the provision of having an open bore 163' in said core shaft and continuing from the root to the tip of the blade, is for the purpose of removing all loose grit after the arc welding. Thereafter I insert a suitable quick hardening paste or coating of tar or pitch-like substance for arresting remaining particles that could not be removed even by suitable power driven tools. This pitch coats the interior inaccessible surface where such grit may be lodged, thereby anchoring the grit against displacement. Furthermore, the hollow passage of the spar is then packed with suitable felt or other packing 170' to fully arrest any particle from loosening or moving under the centrifugal force of the running propeller, for the purpose of permanently retaining absolute balance of it.

To facilitate application by arc welding into the two half blades, the core shaft 161 is also formed in halves and screw bolts 192 are provided to properly locate said halves in the welding apparatus and later said bolts 192 are used for clamping said halves permanently.

Figure 10 shows a spar die 187 with respective flat pitch line surfaces 190 as well as an enlarged cross section with a complete spar formed around said die and showing the joint 181. A chucking section 188 extends at the root section and centers 188' are applied at either end for properly operating said die in a suitable machine. An alternate procedure of securing the hollow blade form 227 to the spar 170 is by spot welding as shown in Figures 2, 3 and 16, and in said procedure the core shaft remains in one piece and the smaller bore 163' is first bored and then the larger one 163 is made, thereby leaving the inner shoulder 192', leaving the stock to receive the bolts 192.

The plug welding 175', 174' may be done by arc welding. The two half blades, as well as the bottom seal 161' and the top seal 162' may be put on by spot welding. The welding apparatus shown in Figure 5 has the same circular sections 201 for setting the respective blocks 213, 219. However, they are preferably of brick or other fire resisting material as in this alternate procedure the joining of the half blades 194, 195 is reenforced by brazing in a brazing furnace, and while it is known that attempts have been made for filleting certain weldings by soldering with soft cuprous metal, such usage would not perform the function of uniting my two half blades into a solid unit and to stand the strain on the joint.

The sectional setting of the half blades in both procedures of welding is alike as shown in the setting of sections 4b and 5b. Both of those shown, as well as the entire series required by the whole length of the blade (see Figure 7, sections a to h) have the same axial center 212, and the entire series is permanently adjusted in the respective apparatus and after finish welding of one blade the setting is opened by loosening the bolt 207 and the lock 214. Then, turning the lock outward in the direction of arrow 215, the entire section 211 of the apparatus is turned open in the direction of arrow 208 without disturbing the setting of the blocks 213, 219, and the finished blade is taken out and the next two half blades set in. It will be noted that in this apparatus the blade is on edge and is supported at the bottom with the wedges 215 while the top half is held in place by links 216, which supports are of course applied to all sections in order to definitely set the correct pitch of the blade before welding.

It will, of course, be understood that the clamping apparatus shown in Figure 5 is duplicated at intervals throughout the length of the blade so that all portions of the blade are rigidly supported in the proper position before welding or brazing are undertaken.

When the brazing material in the form of wires 224 is set in place as shown in Figure 5, the structure is suitably heated to brazing temperature for the purpose of permanently brazing the two half blades together, as shown in Figure 14, which especially shows the root section of the blade with the fillers 169 in proper position to finish said root section. Said fillers are for the purpose of giving the root section of the blade greater strength, to increase the thrust of this section, as well as to help in the cooling of the engine; a further great advantage is to reduce the strain on the sheet steel in suitably forming the blade (see Figure 8, showing the blank 180 for a half blade and in dotted lines the section 183, 184 which will form the leading edge as well as the trailing edge for each respective blade).

As indicated in Figure 8, the blade blank is wide clear to its shank portion. This requires the use of fillers 169, but involves far less distortion of the blank than would be required to reduce it to a small root diameter. Moreover, the broad face of the blade continuing clear to its root is of great assistance in propulsion and in cooling the engine which drives the propeller. The lack of distortion resulting from choice of the blank form indicated in Figure 8 makes it possible to extend the blade to any desired length, such as would not be possible to achieve with more conventionl blank contours.

This advantage is further increased by split curving the tip of the blade and forming the camber face 182 so that in the folding process it will strike the pressure face 195 in such a manner that suitable spot welding 182' will finish the tip as shown in Figure 9. This view also shows the folded sections 183' and 184' as perspective cross sections, which also show the shaping and suitable mounting of the half spar 178 by suitable welds 178' in the preparation of the half blades for welding them together as shown in Fig. 15. Figure 15 shows the finished welded joint 179, as well as the fillers 169. See Fig. 16 for the welded finish 169', 161', that view furthermore illustrates the strong root section of the core shaft 161 with its bore 163.

In order to summarize the several features of the invention in the complete system illustrated, the following list of their advantages is briefly stated:

*The hub design* presents important advantages in that it is of unusual strength and of unusual simplicity. Unlike many variable pitch propeller structures, the hub for the propeller herein disclosed is unitary, and is preferably not only unitary but made in one single piece, requiring only the provision of the several bores and machined bearing surfaces herein described. It therefore has exceptional strength and offers a minimum of air resistance. It is made with a minimum of labor and material. Any number of blades may be mounted without any fundamental change in hub design.

*The propeller blade* has a great many advantages in the way of simplicity, economy of manufacture, lightness, strength and efficiency. The blade is unique in the manner of its internal reenforcement and the provision of a shaft mounted in such reenforcement to project from the root end of the blade for its mounting. It is also unique in the specific manner in which it is fabricated, being made of channel-shaped blade parts each comprising sheet metal folded upon a line representing the leading or trailing edge of the blade so that the union between the parts is made along the center line of the pressure and camber faces. The blade is also unique in the construction of its tip and its root portions. While particularly adapted for use in a variable pitch propeller, the blade is of such a character that it may be mounted in any hub for use in any type of propeller, variable pitch or otherwise, and its pitch adjustment may be controlled in any manner.

*The method of blade manufacture* is closely related to blade structure and makes possible the specific features of blade construction above noted. The method involves the particular manner in which the component parts of the blade are pre-fabricated and joined together, including not only the channel-shaped members which provide portions of the blade faces, but also the reenforcing or spar sections which are incorporated within the blade and serve to mount the stub shaft upon which the blade may be mounted in the hub. The preferred method of blade manufacture includes the construction of channel-shaped core shaft blanks; the construction of channel-shaped spar elements concentric to the channel-shaped core shaft blanks; the construction of channel-shaped leading and trailing blade elements each including pressure and camber face portions; the welding of the spar and core elements to the respective portions of the blade elements, desirably using plug welds at the root portion of the blade and marginal welds at the tip portion where they divide into arcuate spaced webs; and the subsequent welding marginally of the corresponding edge portions of the blade elements and spar elements to unite the assembled blade, spar and core shaft elements upon a plane transverse with respect to the blade between its leading and trailing edge. In this manner the respective half sections of core and spar rigidly support the blade half sections during the fusing process which joins both the blade sections and the core and spar along their abutting midchords.

The method is also concerned with elimination of material unavoidably left by the welding or brazing operations in the interior of the blade. Such material must be either completely removed or completely fixed as to position, as otherwise it would, when dislodged, destroy the balance of the blade. The method of construction includes the removal of all such material as is loose, and the permanent fixation of the remainder, the packing used as a part of the fixation process being variable as to amount, whereby to assist in balancing the blades against each other.

I claim:

1. A fabricated propeller blade comprising a pair of channel-shaped elements respectively folded longitudinally to provide trailing and leading blade edges, each of said elements comprising camber and pressure faced blade sections, and each of said elements having its camber face sections dished adjacent the tip of the blade whereby to close at the blade tip the hollow interior of the blade, corresponding sections of the respective elements being marginally joined along lines extending longitudinally of the blade faces intermediate the leading and trailing edge thereof, in further combination with centrally apertured closure means at the blade root fitted between the camber and pressure face sections of the respective elements.

2. In an airplane propeller, the combination with a hub having a tubular outward extension providing an outwardly opening blade socket, of a blade shank member having a bearing in said socket and projecting therefrom, and a hollow fabricated blade assembled upon said member and comprising spaced pressure and camber faces, and an annulus of channel shaped section internally fitting said member and disposed between said faces connecting them respectively to said member, said faces being broad adjacent said hub extension to constitute airfoil surfaces immediately adjacent the hub.

3. A method of propeller blade construction which comprises the cutting of a pair of blanks, each including a propeller edge and contiguous portions of its pressure and camber faces, folding the respective blanks along their respective edge portions, whereby to constitute channel-shaped propeller elements, constructing opposing channel-shaped spar members adapted to fit between the opposing face portions of the respective blanks, welding said spar members marginally between the opposing face portions of the respective channel-shaped blade elements to provide reenforcement individually therefor, and welding the respective blade elements marginally along their corresponding pressure and camber face portions intermediate their respective leading and trailing edge portions.

4. A method of propeller blade manufacture which comprises the construction of a pair of semi-tubular core shaft elements, the construction of a pair of spar elements having semi-tubular portions concentric to the respective core shaft elements and having other portions extending axially beyond said core shaft elements, the welding of said spar element portions to the core shaft elements, the construction of a pair of channel-shaped blade elements, each including a blade edge and contiguous pressure and camber face portions, welding of the spar elements marginally to the opposing face portions of the respective channel-shaped blade elements, and the subsequent welding together marginally of corresponding face portions of the respective blade elements, whereby to provide an internally reenforced hollow blade.

5. A method of propeller blade manufacture which comprises the prefabrication of channel-shaped blade and spar elements, welding the said elements together to constitute a reenforced blade in which the reenforcing element provides a passage throughout the interior length of the blade, dislodging through said passage loose material left from the welding, together with the step of packing filling material into at least a portion of said blade, whereby to immobilize therein material loose but not discharged therefrom.

6. A method of propeller blade manufacture which comprises the prefabrication of channel-shaped blade and spar elements, welding the said elements together to constitute a reenforced blade in which the reenforcing element provides a passage throughout the interior length of the blade, dislodging through said passage loose material left from the welding, together with the steps of adhesively coating the interior of said blade, and thereafter packing said blade with a material to fill at least a portion thereof and to be adhesively positioned therein, whereby to immobilize any further fragments remaining in said blade.

7. A method of blade manufacture which comprises the construction of channel-shaped blade elements, each including a blade edge and contiguous portions of its pressure and camber faces, said elements having margins adapted for edge to edge connection upon said faces, the fabrication of separate spar sections adapted to fit within the respective elements and to extend longitudinally thereof, and the fastening together of the spar sections and the respective elements, including the fusing of the margins of said elements to each other in butt engagement upon lines extending longitudinally of the opposing faces of the blade and along the line of connection between at least one of the spar sections and one of said elements whereby the butts of said elements are supported internally during the fusing operation by which they are connected, whereby to form an internally reenforced hollow blade.

EMIL R. LOCHMAN.

REFERENCES CITED

The following references are of record in the file of this patent:

UNITED STATES PATENTS

| Number | Name | Date |
|---|---|---|
| 1,329,473 | Peoples et al. | Feb. 3, 1920 |
| 1,378,113 | Hewitt | May 17, 1921 |
| 1,415,412 | Shaver | May 9, 1922 |
| 1,501,606 | Leitner | July 15, 1924 |
| 1,530,249 | Eveleth | Mar. 17, 1925 |
| 1,666,441 | Craft et al. | Apr. 17, 1928 |
| 1,732,234 | Jensky | Oct. 22, 1929 |
| 1,789,240 | Leitner | Jan. 13, 1931 |
| 1,835,006 | Bolduc | Dec. 8, 1931 |
| 1,839,811 | Squires | Jan. 5, 1932 |
| 1,839,895 | Rossi | Jan. 5, 1932 |
| 1,842,178 | Kempton | Jan. 19, 1932 |
| 1,908,893 | Edman | May 16, 1933 |
| 1,954,864 | Crafts | Apr. 17, 1934 |
| 1,988,202 | Hoover | Jan. 15, 1935 |
| 1,996,850 | Bendix | Apr. 9, 1935 |
| 1,999,136 | Cierva | Apr. 23, 1935 |
| 2,042,099 | Hoover | May 26, 1936 |
| 2,044,607 | Garrett | June 16, 1936 |
| 2,050,142 | White | Aug. 4, 1936 |
| 2,056,592 | Siddeley | Oct. 6, 1936 |
| 2,064,141 | Askin | Dec. 15, 1936 |
| 2,081,645 | Squires | May 25, 1937 |
| 2,086,772 | La Salle | July 13, 1937 |
| 2,127,687 | Heath | Aug. 23, 1938 |
| 2,152,861 | Bennett | Apr. 4, 1939 |
| 2,170,865 | Lampton | Aug. 29, 1939 |
| 2,220,996 | Feigel | Nov. 12, 1940 |
| 2,221,548 | Lampton | Nov. 12, 1940 |
| 2,228,776 | Mullen | Jan. 14, 1941 |
| 2,231,772 | Nelson | Feb. 11, 1941 |
| 2,235,032 | McKee | Mar. 18, 1941 |
| 2,259,247 | Dornier | Oct. 14, 1941 |
| 2,262,163 | Brauchler | Nov. 11, 1941 |
| 2,263,425 | Lampton | Nov. 18, 1941 |
| 2,280,374 | Chilton | Apr. 21, 1942 |
| 2,293,801 | Caldwell | Aug. 25, 1942 |
| 2,342,421 | Moore | Feb. 22, 1944 |
| 2,354,198 | Chubb | July 25, 1944 |
| 2,362,745 | Davidson | Nov. 14, 1944 |
| 2,394,445 | Handler | Feb. 5, 1946 |

FOREIGN PATENTS

| Number | Country | Date |
|---|---|---|
| 126,456 | Great Britain | Nov. 8, 1918 |
| 231,919 | Great Britain | Apr. 7, 1925 |
| 417,139 | Great Britain | Sept. 28, 1934 |
| 452,611 | Great Britain | Aug. 26, 1936 |
| 700,360 | Germany | Nov. 21, 1940 |
| 267,850 | Italy | Sept. 23, 1929 |